UNITED STATES PATENT OFFICE.

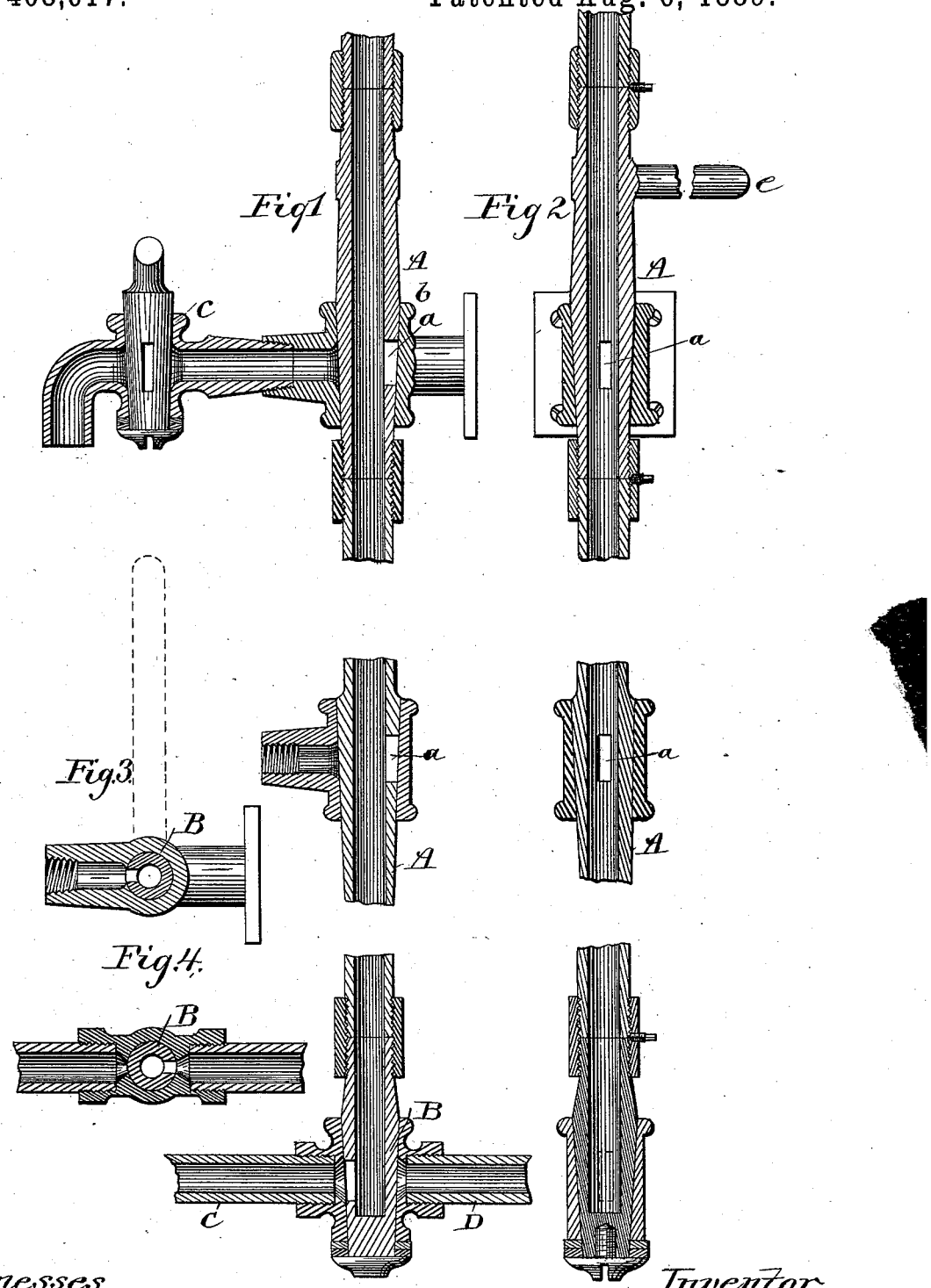

CLARK HAY, OF PORTLAND, OREGON.

SUPPLY AND WASTE COCK.

SPECIFICATION forming part of Letters Patent No. 408,617, dated August 6, 1889.

Application filed February 13, 1889. Serial No. 300,635. (No model.)

*To all whom it may concern:*

Be it known that I, CLARK HAY, a citizen of the United States, residing at Portland, in the county of Multnomah and State of Oregon, have invented certain new and useful Improvements in Supply and Waste Cocks, of which the following is a description.

The objects of my invention are to supply water to the different floors of buildings and to provide means for draining the pipes to prevent freezing therein. These objects I attain by the means set out in the accompanying drawings, and as described in the following specification and claim.

Figure 1. is a longitudinal sectional view showing the valve in a position for supplying water to the building. Fig. 2 is a similar view showing the valve in a position to be drained. Figs. 3 and 4 are sectional views of the supply and waste cock and handle for turning the delivery-pipe into position for supplying water to the different points in the building and for allowing the water to be drained from the pipes to prevent freezing.

In the annexed drawings, A represents the delivery-pipe for supplying water to the different points in a building. At the bottom of this delivery-pipe and connected thereto is the supply and waste cock B, which is adapted to be operated to admit water to the delivery-pipe when in one position, and to allow the pipes to be drained when in another.

C represents the supply-pipe for admitting water to the delivery-pipe, and D represents the waste-pipe, to be connected to a sewer for carrying off the waste water to be drained from the delivery-pipe. The supply and waste pipes are connected to a suitable coupling or casing which contains the stop and waste valve.

The delivery-pipe A is provided with openings *a* at intervals for allowing water to be drawn from the different points, and surrounding these openings are the fittings *b*, provided with the faucets *c*.

The delivery-pipe A is provided with the handle *e* for turning the same to allow water to be admitted from the supply-pipe, and to allow the same to be drained when turned in the opposite direction, whereby the water remaining in the delivery-pipe will pass off into the waste-pipe D into the sewer, and thus prevent the freezing and bursting of the delivery-pipe.

Having thus described my invention, what I desire to secure by Letters Patent is—

The combination of the delivery-pipe provided with faucets at intervals on the same for supplying water to the different floors of a building, said delivery-pipe being provided with openings and having the supply and waste valve connected therewith, and means for turning said pipe to admit water and allow the same to be drained to prevent freezing, as and for the purposes set forth.

CLARK HAY.

Attest:
JOHN F. CAPLES,
J. F. BOOTHE.